Figures 1, 6:
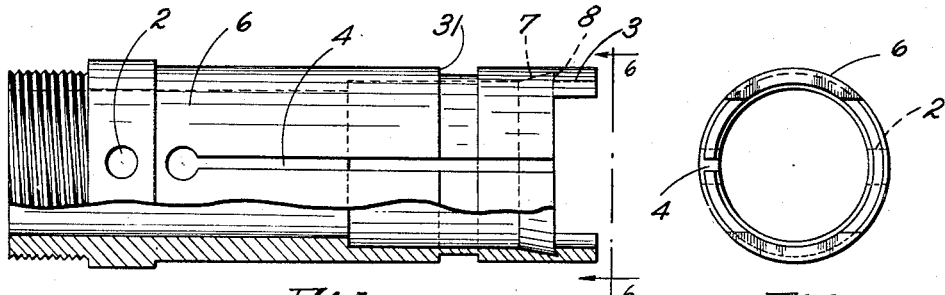

Oct. 27, 1942.  W. P. GALLEN ET AL  2,299,972

MASTER PUSHER

Filed July 24, 1940

INVENTORS
WILLIAM P. GALLEN
& ROY R. GALLEN
BY
ATTORNEYS

Patented Oct. 27, 1942

2,299,972

UNITED STATES PATENT OFFICE 2,299,972

MASTER PUSHER

William P. Gallen and Roy R. Gallen, Cleveland, Ohio

Application July 24, 1940, Serial No. 347,264

11 Claims. (Cl. 29—62).

This invention relates to pushers or feeding sleeves or stock feeding collets as the same are variously termed in the art, which by whatever means perform the duty of longitudinally advancing the stock through the spindle of an automatic screw machine, whereby to present a new piece of stock to be worked upon and to be gripped in working relation by the driving collet or chuck which drives the stock in its rotary motion during the cutting, forming or other operations.

More particularly, our invention relates to an improved feeder or stock pusher having certain features and advantages which will become more clearly apparent in the course of the following description of a preferred form thereof, and which make possible the accomplishment of the objects of our invention including those objects particularly referred to herein.

Much of the successful operation, particularly of an automatic screw machine, depends upon the performance by the stock feeder or pusher of all of its intended functions. Moreover a substantial element of the cost of operation of the screw machine depends upon the time required for changing the set-up from one run of stock to another, which includes or has included a time required for changing pushers or at least changing those portions of the pushers which engage the stock so that the stock may be satisfactorily gripped by an appropriately formed pusher or gripping element.

It is among the objects of our invention to provide a pusher of a simple yet rugged design and construction, which will securely grip and advance the stock and hold the same against the stop so that a full length of work piece will be furnished through and to the driving collet and to the tools of the machine. Another object is to provide a pusher in which the certainty of the accomplishment of the above named object is such that the full speed and efficiency of the machine can be maintained without delay or waste from imperfectly or slowly fed stock. Another object is to provide a pusher capable of receiving and satisfactorily gripping and feeding pieces of stock having a wide range of differences in dimensional tolerances and imperfections both in and around their end and side surfaces. Another object is to provide a pusher which will feed satisfactorily the last increment or increments of stock without waste thereof or injury to the pusher or collet or attendant mechanism.

Further objects of our invention include the provision of a pusher capable of handling a wide variety of different sizes and shapes of stock through the use of readily interchangeable gripping elements. Another object is to provide a pusher in which the interchange of the stock gripping element may be very expeditiously accomplished, and in which the interchangeable parts may be easily and positively secured in working relation.

Other objects will appear in the following description of the preferred form of one embodiment of our invention. The essential characteristics are summarized in the claims.

Figures 2, 5:
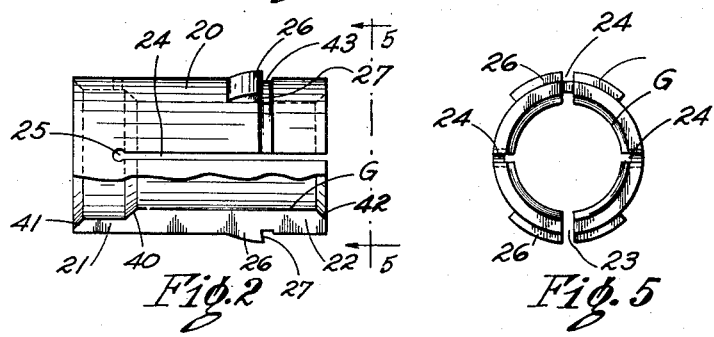
Figure 3:
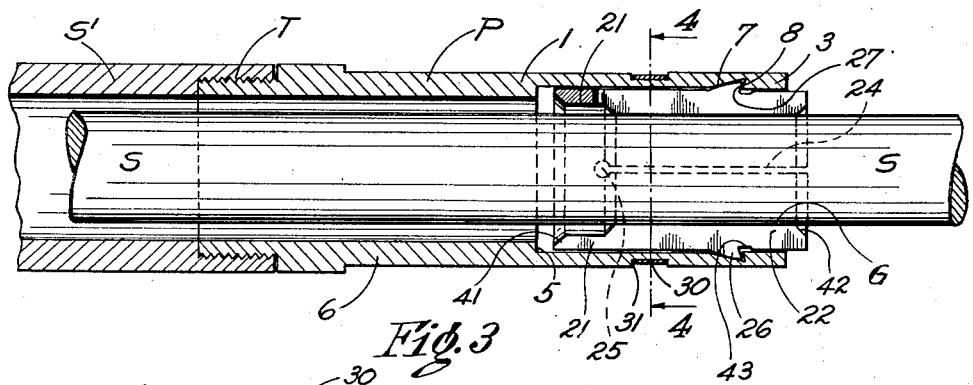
Figure 4:
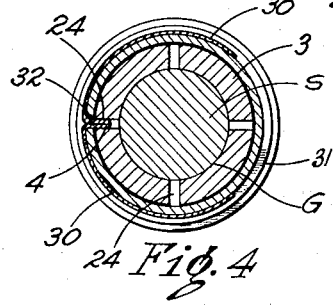

In the drawing Figure 1 is a partially broken side elevation of the outer shell of the pusher showing the slotted side thereof; Figure 2 is a partially broken side elevation of one of the inner stock gripping elements adapted to be received and operatively associated with the shell shown in Figure 1; Figure 3 is a longitudinal section of the elements of Figures 1 and 2 assembled together and also associated with the main pusher sleeve and stock as the several elements are arranged within the spindle; Figure 4 is a section taken along the lines 4—4 of Figure 3; Figure 5 is an end view taken along the lines 5—5 of Figure 2; and Figure 6 is an end view taken along the lines 6—6 of Figure 1.

As is well known to those skilled in the art, pushers or feed collets of the class to which our invention relates are arranged within the spindle of the machine not shown, whereby to embrace the stock S, see Figure 3, and to be engaged for longitudinal motion by a main feeding or pushing sleeve S', the latter being commonly internally threaded to receive external threads at the left or rear end of the pusher P as shown at T.

Those skilled in the art will also understand that the sleeve S', being driven by appropriate mechanism not shown, transmits driving or feeding force and motion to the pusher P in a direction to the right as shown in Figure 3 at appropriate times in the cycle of the operation of the machine, and that at alternate times in the cycle the sleeve S' moves leftwardly, as shown in Figure 3, exerting retracting force and motion to the pusher P. During the rightward motion of the sleeve S' and pusher P, as shown in Figure 3, the pusher is required to grip the stock S to move it bodily rightward. During the leftward motion of the sleeve S' and pusher P, the stock is held against longitudinal motion and the pusher is required to move relatively thereto to a retracted position where in the succeeding cycle it must grip the stock and advance it again. Those skilled in the art will also understand that the advancing or feeding motion of the stock S is often if not always limited and terminated by bodily impact against the fixed stop suitably positioned to the right of Figure 3, not shown herein, and that frequently the feeding or rightward motion of the sleeve S' exceeds or tends to exceed the possible corresponding motion of the stock S, since the motion of the latter may be strictly limited by the stop above referred to. This situation requires, particularly for efficient high speed operation, that the pusher grip the stock so firmly that the stock will not tend to bounce or bound away from the stop to a false position, and further requires that the pusher have the ability to yield somewhat to compensate for the difference between the greater longitudinal movement of the sleeve S' and the lesser longitudinal movement of the stock S when the latter's motion is terminated by contact with the stop not shown.

The pusher P embodying our invention comprises the outer shell or generally cylindrical body 1 which, as mentioned above, may conveniently be externally threaded at its left end for engagement with the main feed sleeve S', and preferably has a slightly raised collar notched or otherwise apertured as at 2, see Figure 1, to receive a wrench for attachment to the main feeding sleeve S'. At the other end, the sleeve or body portion 1 terminates in a bifurcated end 3, see also Figures 1 and 6, which is so cut away as to function as the female element of a bayonet lock with complementary parts of the gripping element 20 shown in Figures 2 and 5. The main sleeve 1 preferably has a longitudinal slot 4 cut along one side thereof and extending the major portion of its length, whereby to permit a limited amount of give in the whole assembly under conditions of extraordinary stress. As shown also in Figure 3 the main shell 1 is preferably counterbored to a little less than half its length, whereby to leave an internal shoulder 5 with a thickened wall portion 6 extending from the internal shoulders leftwardly as viewed in the drawings throughout the remainder of the length thereof, and providing an increased thickness and strength adjacent and leftwardly beyond the terminus of the slot 4.

The outer shell 1 also has formed interiorly thereof near its open or bifurcated end an annular conical surface 7 broken only by the main slot 4, as shown in Figures 1 and 3. The extreme end portion of the shell 1 is milled away on diametrically opposite sides, see particularly Figures 1 and 6, down to the end of the conical surface 7; the remaining portions 3 overhanging the conical surface and preferably being slightly undercut as at 8, see Figure 3, to form partial conical surfaces, departing only slightly from a radial plane at this point.

The main shell member 1 also preferably has an external annular groove 31 within which may conveniently receive a snap ring or clip 30 which holds the parts 1 and 20 in assembled relation, as shown in Figures 3 and 4.

The gripping element 20 is of generally cylindrical contour preferably having an external cylindrical surface proportioned to slidably fit within the right end portion of the outer sleeve 1 with substantial tolerance as shown in Figure 3. The gripping member 20 at its left or inner end, see Figures 2 and 3, has a reduced wall thickness 21 for a limited longitudinal distance at that end, which in substantially all instances is intended to be of large enough diameter to freely clear whatever stock is to be gripped therein. The remainder of the interior surface of the gripping element 20 is thickened as at 22 in the example shown in the drawings, and has its interior or gripping surface G formed to correspond with the exterior surface of the stock S. Thus when round stock is to be pushed, the particular form of the gripping element 20 to be used in the combination with the outer shell 1 will have its interior gripping surface G formed cylindrically, and when hexagonal or other stock is to be used a gripping surface G will have a hexagonal or other appropriate shape to correspond to the stock. Likewise the thickness of the wall portion or pads 22 will be varied in different elements, so that by the simple substitution of the gripping elements 20 a wide variety of stock sizes can be accommodated; gripping elements with greatly thickened walls or pads 22 will be used to grip small diameter stock, and of course gripping elements having the wall portions or pads 22 of reduced thickness will be used to engage stock of larger diameter. The maximum diameter stock to be handled by the pusher will be limited at the point where the thickness of the wall or pad portion 22 of the gripping element is reduced down to substantially the same thickness as the wall portion 21.

As indicated above, the inner surface G of the wall portion 22 of the gripping element 20 primarily has the function of gripping and engaging the stock, and, as indicated, the same may be constructed of appropriate size and shape for this function. Moreover, and for reasons yet to be set forth, substantially the whole of this portion of the gripping element 20 can be hardened by appropriate heat or other treatment, whereby to be most resistant to wear in carrying out its intended function. We prefer that the gripping element 20 as well as the outer shell 1 be made of steel, preferably of such character that the same may be treated in a manner to give the inner surfaces of the thickened wall 22 the characteristics of great hardness, while by different and appropriate treatment the left and thinner wall portion 21 may be separately treated to give it a spring temper, i. e. a resilience through which the gripping element 20 will always tend to squeeze the stock within its embrace with a preliminary tension or grip heavy enough to cause an initial drag between the gripping element and the stock, but light enough to permit the gripping element to be moved relative to the stock, particularly on the back stroke or leftward movement of the pusher with respect to the stock when the stock is held against leftward movement in the driving collet, not shown, of the machine or spindle.

The thickness of the wall portion 21 is preferably held to a minimum consistent with its intended function whereby to accommodate the maximum stock diameters; we prefer to retain or increase the length of this portion where greater gripping strength is sought especially for the elements intended for the largest stock sizes.

To permit the gripping action of the gripping element 20 on the stock, the element has preferably one continuous longitudinal slot 23, see particularly Figure 5, extending its whole length, whereby the element as a whole may function more or less as a split ring, tending to contract and tending to close the slot 23. Necessarily, when the inner gripping surfaces of the wall portion 22 are formed cylindrically, and the intended size of stock with its normal or ordinary variations in diameter is being gripped, the contacting surfaces would theoretically at least depart more or less from ideal contact, and for that reason we provide additional longitudinal slots 24, preferably spaced about 90° from each other and from the slot 23, and these slots preferably extend the full length of the gripping surfaces terminating as at 25 just beyond, i. e. to the left of the terminus of the thickened wall portions 22, and in the edge of the resilient zone of the gripping element in the thinned resilient wall 21. By this means the gripping surfaces and pads or thickened wall portions 22 are thus four in number in the form shown, and are independent enough of each other to be permitted to separately conform to the exterior surface of the stock to more fully and comprehensively embrace the same, both in response to the initial tension from the resilient wall 21, and from the other forces yet to be described.

Exteriorly of the gripping element 20 are formed oppositely disposed raised cam surfaces 26, each of which occupy about 90° of the circumferential length on the exterior of the gripping element 20, and are of such circumferential length that the gripping element 20 may be inserted into the right end of the outer sleeve 1, while the cam surfaces occupy a horizontal plane relative to the sleeve in the position shown, for example, in Figures 1, 3 and 6, so that the gripping element 20 as a whole may be inserted from the right end of the outer sleeve 1 until the cam surfaces 26 make contact with the female conical cam surface 7 of the sleeve 1. Thereupon a 90° rotation of the gripping element 20 brings the cam surfaces 26 to the position shown in Figure 3, with the forward or rightward face 27 of the cams 26 adjacent to the undercut surfaces 8 in the inner wall of the main shell 1 of the pusher. With the gripping element 20 so arranged within the outer shell 1, the same is there secured against circumferential movement, preferably by a spring clip 30 lying in the outer annular groove 31 of the outer shell member, and having such a circumferential extent in excess of 180° as to be self-retaining in the groove 31 as shown in Figure 4. Preferably the mid-portion of the spring clip 30 is doubled back upon itself to form a finger 32 extending through the slot 4 of the outer shell, and extending into one of the slots 24 of the inner gripping element, as shown in Figure 4. In this manner the gripping element 20 is secured against all but a very limited circumferential movement relative to the outer shell 1, an easy sliding fit being preferred between the finger 32 and the slots 4 and 24, but the gripping element 20 having a substantial tolerance between its outer cylindrical wall and the adjacent inner cylindrical surface of the sleeve 1 is free to have longitudinal motion and limited transverse motion with respect thereto. The relative longitudinal motion is limited in the first instance by the relationship between the cam surfaces 26 and 7 on the one hand, and 27 and 8.

As shown particularly in Figure 5 the cams 26 are preferably bisected by the upper of the slots 24 and the opposite lower slot 23 whereby each circumferentially separated pad portions has an independent cam portion integrally formed with and acting directly with it.

As shown in Figure 3 the inner or extreme left end of the gripping element 20 normally lies spaced somewhat from the inner shoulder 5 of the outer shell, but is longitudinally adjacent thereto, whereby an extreme condition of leftward movement of the gripping element 20 within the shell 1, as viewed in Figure 3, will be limited by contact with the shoulder 5. Preferably this arrangement of parts is such that the left end of the gripping element 20 will contact the shoulder 5 before the cam surface 26 is wholly out of contact with the cam surface 7, or more accurately, before the cam surface 26 has been longitudinally displaced beyond the longitudinal limit of the zone of the cam surface 7.

We prefer that the cam surface 7 be pitched at about 10° from the longitudinal axis of the pusher, although those skilled in the art will understand that a reasonably wide choice of angles may be used not inconsistent with the character of the contacting cam surfaces, both as to hardness, coefficient of friction, desired length of travel, and the relative stiffness of the parts and otherwise, which collectively tend to constitute the reasonable limits of variation of this angle. Of course the pitch of the angle should be such that the outer shell and the inner gripping element will not tend to bind or freeze in engagement, and this factor in turn depends more or less upon the drag between the inner gripping surfaces of the gripping element and the stock as will more fully appear in the description of the operation of the device yet to be set forth.

Preferably the outer surface of the cams 26, which contact the cam surfaces 7, have a similar pitch, and are preferably rounded slightly whereby to limit the area of contact between these surfaces when the parts are under load.

The outer shell 1 is preferably formed with its leftward portion, as viewed in the drawings, of such material, preferably steel, that it is capable of receiving a spring temper whereby the rightward portion of the shell may expand more or less in response to expanding forces or reactions exerted principally through the cam surface 7, as permitted by the main longitudinal slot 4. The rightward portion, and more particularly the portion of the shell adjacent the cam surface 7, preferably being of the same material as the leftward portion of the sleeve, is hardened, whereby to provide particularly a hardened surface for the cam 7. As indicated above, directly adjacent the right end of the cam surface 7 is a steeply pitched cam surface 8, preferably so pitched as to be only a few degrees from the radial plane of the pusher, and this cam surface is arranged in complementary relation with a similarly pitched surface 27 on the cams 26, so that a leftward motion of the sleeve 1 with respect to the gripping element 20 tends somewhat to expand the element 20, or at least does not tend to contract it nor resist a slight expansion of the element 20 during engagement of these surfaces when the outer shell 1 moves leftwardly and draws the gripping element leftwardly against its initial grip or drag on the stock.

As shown with some exaggeration, the junction between the thickened wall portion or pad 22 of the gripping element 20 with the resilient and thinner wall portion 21 is formed with an inclined conical surface 40, which forms a tapered throat varying, of course, in extent, depending upon the thickness of the wall portions 22, whereby to guide the stock into the gripping element when the same is first received within the pusher. Preferably also the extreme longitudinal end walls of the gripping element 20 are chamfered more or less as at 41 and 42, the former for reasons similar to that incident to the taper of the surface 40, and the latter essentially to eliminate burrs that might otherwise exist in the manufacture of the element 20, which might interfere with the desired gripping relationship between the gripping surfaces of the element 20 in the stock. It may also be noted in passing that we prefer that the external surface of the gripping element 20 be grooved slightly as at 43 adjacent the cam surface 27, whereby to facilitate the machining and formation of the cam surface 27.

In operation, it is of course assumed that a gripping element 20, having its inner gripping surfaces corresponding to the stock to be fed, has been selected and positioned within the sleeve 1 in the relationship shown in Figures 3 and 4, and that the stock has been forced into the gripping element wholly or partly as shown in Figure 3. Thereupon, and at the beginning of the cycle, the gripping element 20 has its initial grip or drag on the stock as induced from its inherent resiliency afforded by the spring characteristics of its wall portion 21, and the parts being in the position shown with the cam surfaces 26 and 7 either lightly contacting or slightly out of contact, the converse being true of the relationship between the cam surfaces 8 and 27. In this stage of operation the stock as well as the main sleeve S', and the pusher as a whole, may well be rotating with the spindle and with the driving collet, not shown, of the machine. After the work has been formed and cut off and the driving collet releases the stock, the main sleeve S' is moved rightwardly by mechanism not shown, but well understood, driving the outer sleeve 1 rightwardly and forcing the cam surfaces 7 rightwardly with respect to the cam surfaces 26 more or less as the effort required to move the stock S rightwardly is required. In any event, the rightward movement of the cam surfaces 7 is resolved into two major components of force, the longitudinal component tending to move the gripping element 20 rightwardly, and the radial component tending to increase the grip of the gripping element upon the stock S; the initial drag between the gripping element 20 and the stock S being so proportioned with respect to the pitch of the cams 7 and 26, due and proper allowance having been made for the friction therebetween and between the inner surface of the gripping element and the outer surface of the stock, that the gripping force upon the stock will be sufficiently increased to move the stock bodily rightward the full distance required to be moved, forcing it quickly and firmly against the stop of the machine, not shown. In this connection it is among the advantages of our invention that the flexibility of the gripping element is such, among other reasons the provisions of the longitudinal slots with the tempered ring-like portion 21 and the relatively independently acting thickened wall or pad portions 22, that a satisfactory initial drag can be maintained between the gripping element and stock consistent with the other objects and functions of the device, that a wide range of dimensional tolerances in the stock as well as imperfections in the surface of the stock can be accommodated and efficiently handled. As the stock engages the stop, and its rightward movement is halted, it will be appreciated that the change in the values of the gripping forces will be altered sharply, since the tendency of the pusher is to continue its rightward motion as against the abrupt holding of the rightward motion of the stock. In the prior art many pushers are deficient at this point in that the stock is permitted to bounce more or less leftwardly where the same may be gripped by the driving collet, thereby presenting an insufficient length of work piece to the tools of the machine. In our invention, however, the tendency of the stock to bounce leftwardly from the stop is met with an increasing gripping force, which, with the continued though limited rightward movement of the pusher as induced by the main sleeve S', continues to force the stock rightwardly and hold it against the stop, even though the gripping surfaces of the gripping element upon the stock may slide somewhat thereupon. Of course the combination of the forces at this point in the cycle is such as to tend to burst the outer shell 1, and for this reason among others, we have provided the longitudinal slot 4 therein, and have formed at least the leftward portion of the body thereof to be resilient or springy whereby to permit the annular female cam 7 to expand, while maintaining a high gripping force on the cams 26. As mentioned above, particularly where the stock might be over-sized, or perhaps for a combination of other reasons, expansion of the shell 1 permits a relative rightward motion thereof with respect to the inner gripping element 20, but this motion is limited by the inner shoulder 5 directly engaging the left end of the gripping element 20, whereby in all events a firm grip is maintained upon the stock, and a continuous and firm force is imparted to the stock to hold it against the stop.

While the stock is so held the same is engaged by the driving collet, and the next step in the cycle is induced by the leftward movement of the main sleeve S', drawing the pusher leftwardly relative to the stock to its next gripping position, from which the whole cycle will be repeated. To facilitate this step the cam surfaces 8 and 27 preferably have a slight pitch in the direction shown, tending to withdraw the thickened wall portions 22 of the gripping element 20 from their gripping or at least maximum gripping relationship with the stock, and of course will impart a leftward longitudinally acting component of force as well as some radially outwardly acting force to the walls 22 of the gripping element. The stock, being securely gripped and held against longitudinal movement by the driving collet, the pusher as a whole is then moved leftwardly as induced by the sleeve S' to the position first above described, where as the leftward force from the sleeve S' diminishes, as the same comes to rest, and the radial outwardly acting component of force from the cam surfaces 8 and 27 diminishes, the inner gripping element is free of outward forces to assume its natural and normal resilient grip upon the stock through the spring tension of the wall 21 thereof, and the whole cycle of operation is ready for repetition.

It will be observed that the gripping surfaces of the thickened walls or pads 22 are hardened and are radially supported at their left end by their junction with the slotted ring portion 21 of the gripping element, and are held or forced inwardly thereby particularly at the leftward ends thereof. The cam surfaces 7 and 26 exert their radially inward gripping force generally toward the mid-portion of the longitudinal length of the thickened walls or pads 22, whereby these walls or pads not only are capable of gripping the stock when the same is positioned, as shown in Figure 3, but are also capable of obtaining a firm grip upon the stock when less than the whole longitudinal length of the thickened walls or pads 22 have contact with the stock, as often happens when the end of the stock is being fed.

One of the advantages of our invention is that our pusher will grip and accurately hold the last increment of stock, even though only a relatively small portion lies within the body of the pusher, i. e. as where the end of the stock may lie in and about the radial zone of the cams 7 and 26.

While we have illustrated and described only a preferred form of our invention, and have mentioned only a limited number of the advantages to be obtained by the use of our collet, modifications and changes and other advantages will occur to those skilled in the art, all within the precepts of our invention, and we do not care to be limited to the particular form herein shown and described or otherwise except by the claims appended hereto when construed with the full range of equivalents to which they are entitled in view of the prior art.

We claim:

1. In a stock feeding collet the combination of an outer shell and an inner stock gripping element, the inner stock gripping element being slotted and contractable upon said stock, and having external inclined cam surfaces at circumferentially spaced points, said outer shell having complementary cam surfaces and overhanging portions adjacent thereto circumferentially spaced, whereby to permit the reception of said first named cam surfaces therebetween in one angular position, but to prevent the withdrawal thereof in another angular position, the latter construction functioning as a "bayonet lock" to facilitate the assembly and disassembly of said parts.

2. The combination according to claim 1 in which said outer shell and said inner gripping element each have radial openings arranged to be radially aligned when said parts are angularly disposed in assembled relationship, with means removably attached to said parts and extending through said radial openings, whereby to maintain the parts in assembled relationship.

3. In a stock feeding collet an outer shell having a resilient tempered portion and a longitudinally adjacent hardened portion with a longitudinal slot extending through said hardened portion and into said resilient portion, whereby to permit limited and restrained expansion thereof, and an inner stock gripping element disposed within at least the hardened portion of said outer shell and free to have limited axial motion with respect thereto, and having a plurality of hardened gripping pads circumferentially spaced from each other, each of said pads having external inclined cam portions and said sleeve having adjacent complementary cam portions coacting with said first named cams whereby relative axial motion therebetween tends to contract said pads with forces limited by the yielding tendency of the resilient portion of said sleeve.

4. The combination according to claim 3 in which the cam surfaces of said sleeve are substantially conical, and in which the complementary cam surfaces of said inner gripping element are rounded to depart slightly from true conical surfaces whereby to reduce the area of working contact between said cams.

5. In a feeding collet the combination of an outer sleeve element and an inner stock gripping element contained therein with freedom for limited axial and circumferential movement with respect thereto, both said elements comprising circumferentially slit resilient portions tempered and set to yieldably held minimum diameter, both said elements also having longitudinally adjacent circumferentially slit hardened portions coacting together along inclined cam-like surfaces through which relative axial motion between said elements tends to force at least the hardened portions of said inner gripping element radially inward upon the stock to be fed, the said inner gripping element having an initial grip or drag upon the stock by virtue of its initial resilient set and the said outer sleeve element being adapted to yield radially in response to excessive forces developed between said cam surfaces.

6. The combination according to claim 3 in which said elements have additional complementary disposed inclined cam-like surfaces arranged to exert forces tending to expand said inner gripping element during the retracting motion of said sleeve relative to said stock.

7. In a stock feeding collet, a female sleeve member, stock engaging means disposed within said female member and movable axially and radially therein with respect thereto and having relatively movable stock engaging portions, resilient means urging said portions to frictional engagement with said stock, and means coacting with said member and first named means responsive to relative axial movement therebetween creating radially acting forces therebetween and modifying the grip of said portions on said stock, said female member being slotted and radially expansible and adapted to yield to relieve excessive stock gripping forces.

8. A stock feeding collet comprising an outer sleeve having an open end out of which stock is fed and an inwardly tapering surface adjacent said open end, stock gripping means disposed at least in part within said sleeve comprising relatively movable stock engaging parts movable longitudinally with respect to said sleeve and movable radially with respect to each other, said parts each having radially enlarged portions circumferentially spaced from similar portions of adjacent parts and disposed within and adapted to bear upon the said tapering surface of said sleeve whereby to induce radial force and motion between said parts and said sleeve as said portions move inwardly of said surface, resilient means associated with said parts and urging the same radially inward to bear upon the stock, said sleeve being resilient and being longitudinally slotted adjacent said tapering surface to permit restrained expansion thereof, and means restraining relative rotation between said parts and said sleeve.

9. In a stock feeding collet, a female sleeve member, a stock engaging male member disposed within said female member and movable therein and having relatively movable stock engaging portions, means resiliently urging said portions to engagement with said stock, said stock gripping portions being circumferentially spaced from each other and forming a longitudinal slot therebetween, and means carried by said female member and entering said slot and engaging one of said portions whereby to tend to increase said circumferential spacing when turning movement of said stock tends to turn said male member within said female member.

10. In a stock feeding collet the combination of an outer shell element and an inner stock gripping element, the inner element being engageable with the stock and having externally enlarged portions at circumferentially spaced points, said outer shell having recessed surfaces disposed complementarily to said enlarged portions and movably related thereto and having adjacent circumferentially spaced overhanging portions between which said spaced enlarged portions may be passed to quickly assemble the parts in a "bayonet lock" relationship, said elements coacting to grip and feed the stock when stock feeding movement is induced in the outer element.

11. A stock feeding pusher comprising an outer female sleeve member having an open end in the direction of stock feeding movement, and an inner stock engaging male member removably insertable into said end of said female member, the adjacent surfaces of said members being formed to provide a "bayonet lock" connection therebetween upon the insertion and turning of said male member to working position within said female member, said members having inclined plane surfaces coacting in said working position to induce relative radial movement therebetween to grip and feed the stock during feeding movement of said pusher, and means limiting the relative turning movement between said members while permitting relative longitudinal movement therebetween.

WILLIAM P. GALLEN.
ROY R. GALLEN.